(12) United States Patent
Garg et al.

(10) Patent No.: US 11,577,285 B2
(45) Date of Patent: Feb. 14, 2023

(54) SYSTEMS AND METHODS FOR SENSOR LENS CLEANING

(71) Applicant: GM GLOBAL TECHNOLOGY OPERATIONS LLC, Detroit, MI (US)

(72) Inventors: Rachit Garg, Karnataka (IN); Julien P. Mourou, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/231,444

(22) Filed: Apr. 15, 2021

(65) Prior Publication Data

US 2022/0331844 A1 Oct. 20, 2022

(51) Int. Cl.
*B08B 3/14* (2006.01)
*B08B 3/04* (2006.01)
*H04N 5/217* (2011.01)
*G01S 7/497* (2006.01)

(52) U.S. Cl.
CPC ............... *B08B 3/14* (2013.01); *B08B 3/041* (2013.01); *G01S 7/497* (2013.01); *G01S 2007/4977* (2013.01); *H04N 5/2171* (2013.01)

(58) Field of Classification Search
CPC . B08B 3/14; B08B 3/041; G01S 7/497; G01S 2007/4977; H04N 5/2171
USPC ........................................................ 134/109
See application file for complete search history.

(56) References Cited

U.S. PATENT DOCUMENTS

2019/0232315 A1* 8/2019 Mousavi Ehteshami ................... B05B 14/00

* cited by examiner

*Primary Examiner* — Tinsae B Ayalew
(74) *Attorney, Agent, or Firm* — Quinn IP Law

(57) ABSTRACT

A sensor lens assembly includes a cylindrical sensor body including a lower surface, a sensor lens surface, and a side surface extending between the lower surface and an outer edge of the sensor lens surface, a sensor enclosed within the cylindrical sensor body and adjacent to the sensor lens surface, and a nozzle configured to deliver a fluid near a center point of the sensor lens surface. The sensor lens surface is concave and rotates relative to the side surface of the cylindrical sensor body such that centrifugal force causes the fluid to form a film on the sensor lens surface that acts as a barrier, cushion, and particle collecting medium on the sensor lens surface.

20 Claims, 2 Drawing Sheets

SYSTEMS AND METHODS FOR SENSOR LENS CLEANING

INTRODUCTION

The present disclosure relates generally to the field of vehicle sensors including using a fluid film to protect a sensor lens from debris.

The operation of modern vehicles is becoming more automated, i.e., able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Autonomous vehicles are equipped with a variety of sensors to provide information on the surrounding environment. Sensors commonly found on autonomous vehicles include LIDAR sensors, RADAR, and optical cameras. During operation, debris or damage may occur to the lens of the sensor. The damage or debris may compromise the field of view of the sensor and thus compromise performance of the autonomous driving system.

SUMMARY

Embodiments according to the present disclosure provide a number of advantages. For example, embodiments according to the present disclosure mitigate the effect of damage to or debris on a lens of a vehicle sensor, such as, for example and without limitation, a LIDAR sensor or optical camera. A fluid film is generated on a rotating, concave exterior surface of the sensor lens using, in some embodiments, liquid injection from pressurized nozzles. The fluid film acts as a barrier and cushion for the sensor lens surface. Additionally, the fluid film provides self-cleaning benefits as the film traverses the concave lens surface due to the influence of centrifugal force.

In one aspect of the present disclosure, a sensor lens assembly includes a cylindrical sensor body including a lower surface, a sensor lens surface, and a side surface extending between the lower surface and an outer edge of the sensor lens surface, a sensor member enclosed within the cylindrical sensor body and adjacent to the sensor lens surface, and a nozzle configured to deliver a fluid near a center point of the sensor lens surface. The sensor lens surface is concave and rotates relative to the side surface of the cylindrical sensor body such that centrifugal force causes the fluid to form a film on the sensor lens surface that acts as a barrier, cushion, and particle collecting medium on the sensor lens surface.

In some aspects, the nozzle includes a first nozzle and a second nozzle.

In some aspects, the assembly further includes a catch basin that at least partially surrounds the sensor body such that the catch basin captures fluid that falls over the outer edge of the sensor lens surface.

In some aspects, the assembly further includes a tank fluidicly coupled with the catch basin such that the captured fluid is stored within the tank.

In some aspects, the assembly further includes a connecting member configured to allow fluid to pass from the catch basin to the tank.

In some aspects, the nozzle is fluidicly coupled with the tank such that the captured fluid is recirculated and reused to form the film on the sensor lens surface.

In some aspects, the assembly further includes a filtering element configured to filter the fluid captured from the sensor lens surface.

In some aspects, the filtering element is disposed within the tank.

In another aspect of the present disclosure, a system for sensor lens cleaning includes a cylindrical sensor body including a lower surface, a sensor lens surface, and a side surface extending between the lower surface and an outer edge of the sensor lens surface, and a nozzle configured to deliver a fluid near a center point of the sensor lens surface. The sensor lens surface is concave and rotates relative to the side surface of the cylindrical sensor body such that centrifugal force causes the fluid to form a film on the sensor lens surface that acts as a barrier, cushion, and particle collecting medium on the sensor lens surface.

In some aspects, the nozzle includes a first nozzle and a second nozzle.

In some aspects, the system further includes a catch basin that at least partially surrounds the sensor body such that the catch basin captures fluid that falls over the outer edge of the sensor lens surface.

In some aspects, the system further includes a tank fluidicly coupled with the catch basin such that the captured fluid is stored within the tank.

In some aspects, the nozzle is fluidicly coupled with the tank such that the captured fluid is recirculated and reused to form the film on the sensor lens surface.

In some aspects, the system further includes a filtering element configured to filter the fluid captured from the sensor lens surface.

In another aspect of the present disclosure, a method for cleaning and protecting a sensor lens surface includes providing a sensor having a sensor body including a lower surface, a concave and rotatable sensor lens surface, and a side surface extending between the lower surface and an outer edge of the sensor lens surface and a nozzle fluidicly coupled to a fluid source and configured to deliver a fluid near a center point of the sensor lens surface. The method includes rotating the sensor lens surface relative to the side surface of the sensor body, delivering the fluid to a position near the center point of the sensor lens surface such that the fluid travels from the center point of the sensor lens surface to the outer edge of the sensor lens surface to form a film that at least partially covers the sensor lens surface, capturing the fluid that falls off the outer edge of the sensor lens surface, and recirculating and reusing the fluid captured from the sensor lens surface via the nozzle.

In some aspects, the nozzle includes a first nozzle and a second nozzle.

In some aspects, the method further includes providing a catch basin that at least partially surrounds the sensor body such that the catch basin captures the fluid that falls over the outer edge of the sensor lens surface.

In some aspects, the method further includes providing a tank fluidicly coupled with the catch basin such that the captured fluid is stored within the tank.

In some aspects, the nozzle is fluidicly coupled with the tank such that the captured fluid is recirculated and reused to form the film on the sensor lens surface.

In some aspects, the method further includes providing a filtering element configured to filter the fluid captured from the sensor lens surface.

BRIEF DESCRIPTION OF THE DRAWINGS

The present disclosure will be described in conjunction with the following figures, wherein like numerals denote like elements.

Figure 1:
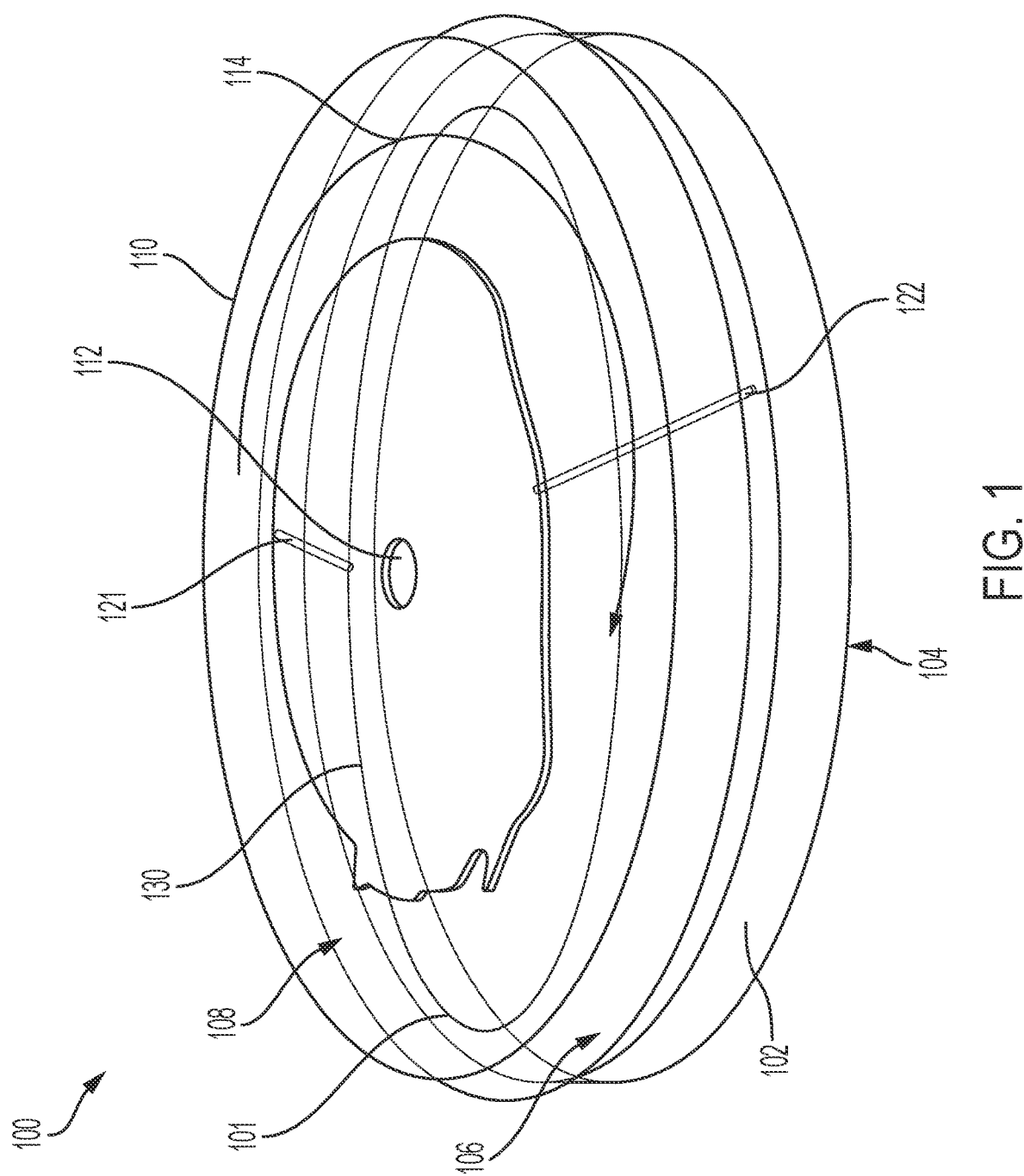
FIG. 1 is a schematic top perspective view of a sensor body having a rotating lens surface covered by a fluid film, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Sensor lenses, such as those for cameras or other imaging sensors, can be damaged by an impingement of debris. The debris can also obstruct the field of view of the sensor, resulting in blurred images and poor sensor performance. Additionally, liquid droplets or other condensation can affect sensor performance and image quality.

Embodiments discussed herein include a rotating, concave sensor lens surface coupled with a sensor body. One or more nozzles direct fluid to a middle of the sensor lens surface. The rotation of the sensor lens creates a fluid film that spreads and covers the sensor lens surface. The fluid film acts as a barrier and cushion for the sensor lens surface. The fluid film also acts as a particle collecting medium and, through centrifugal force, cleans the lens surface.

FIG. 1 schematically illustrates a sensor 100, according to an embodiment. The sensor 100 includes a sensor body 102 having a lower surface 104, a side surface 106, and a sensor lens surface 108. In various embodiments, the sensor body 102 is cylindrical such that the side surface 106 extends between the lower surface 104 and the sensor lens surface 108. The sensor body 102 encloses a sensor member 101, which in some embodiments is an imaging sensor or other optical sensor, LIDAR sensor, radar sensor, etc., for example and without limitation. The sensor member 101 is adjacent to the sensor lens surface 108.

In various embodiments, the sensor lens surface 108 is a concave surface that is rotatably coupled to the sensor body 102. In other words, an outer edge 110 of the sensor lens surface 108 defines a first plane and the center 112 of the sensor lens surface 108 defines a second plane parallel to the first plane.

The sensor lens surface 108 is configured to rotate relative to side surface 106 of the sensor body 102, as shown by the arrow 114. While the sensor lens surface 108 is illustrated in FIG. 1 as rotating in a clockwise direction, it is understood that the sensor lens surface 108 can rotate in either or both of the clockwise and counterclockwise directions.

With continued reference to FIG. 1, a first nozzle 121 and a second nozzle 122 deliver fluid to the sensor lens surface 108, forming a fluid film 130 on the sensor lens surface 108. In various embodiments, the first and second nozzles 121, 122 are pressurized nozzles that deliver a supply of fluid at or near the center 112 of the sensor lens surface 108. The fluid forms a film that acts as a barrier, cushion, and particle collecting medium on the sensor lens surface 108. The viscosity of the fluid dampens the particle impingement force and reduces the probability of debris adhering to the sensor lens surface 108 by altering the physical properties of the sensor lens surface 108. Additionally, the fluid film is a low adhesion and a watermark-free film. For example, salt particles in water that splash onto the sensor lens surface 108 will not leave a mark due to the barrier formed by the fluid film 130.

In various embodiments, the sensor lens surface 108 is a hydrophilic surface. Liquid injection from the first and second nozzles 121, 122 onto the rotating sensor lens surface 108 will result in faster and more uniform formation of the fluid film 130 due to centrifugal force and surface tension. The concave aspect of the sensor lens surface 108 aids in retaining the fluid film 130 on the sensor lens surface 108, thereby reducing the liquid flow rates.

Figure 2:
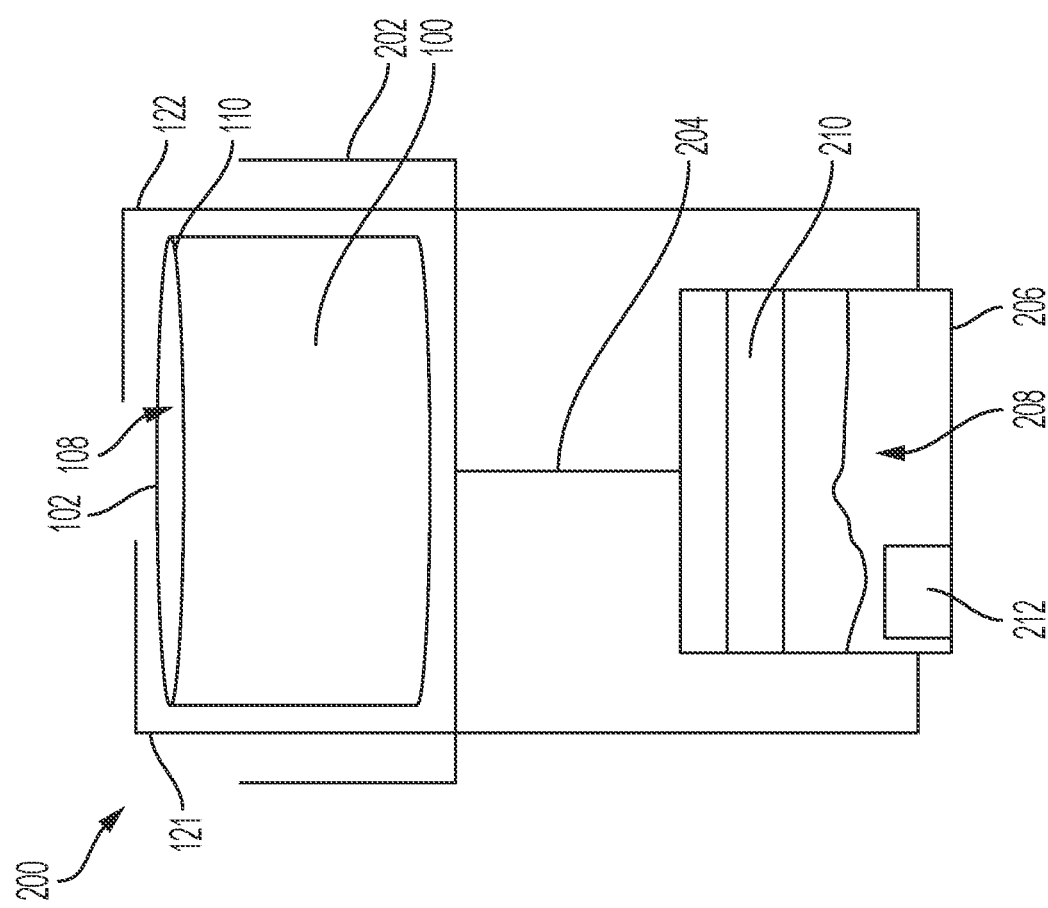
FIG. 2 is a schematic illustration of a sensor lens cleaning system, according to an embodiment.

FIG. 2 illustrates a system 200 for cleaning and protecting a sensor lens surface of a sensor, such as the sensor lens surface 108 of the sensor 100. The system 200 includes a trough or catch basin 202 that is fluidically connected to a tank 206 via a connecting member 204. In various embodiments, the connecting member 204 is a pipe, hose, or other structure configured to allow fluid to pass from the catch basin 202 to the tank 206. The catch basin 202 at least partially surrounds the sensor body 102 of the sensor 100 such that the catch basin 202 captures fluid that falls over the outer edge 110 of the sensor lens surface 108.

As discussed herein, the liquid delivered to the sensor lens surface 108 by the first and second nozzles 121, 122 forms the fluid film 130 on the sensor lens surface 108. Due to the rotation of the sensor lens surface 108, the fluid travels outward, that is, toward the outer edge 110 of the sensor lens surface 108. The fluid falls from the outer edge 110 of the sensor lens surface 108 into the catch basin 202. The fluid accumulates in the tank 206, as shown by the fluid 208. The first and second nozzles 121, 122 draw fluid 208 from the tank 206 and deliver the fluid 208 to the sensor lens surface 108, thus allowing for recirculation and reuse of the fluid 208. In various embodiments, the fluid 208 is filtered by a filtering element either prior to accumulation within the tank 206 or prior to dispersal from the first and second nozzles 121, 122. A filtering element 210 is illustrated as a component of the tank 206, however it is understood that the fluid 208 may be filtered at any point between accumulation within the catch basin 202, transmission to the tank 206 via the connecting member 204, or dispersal from the first and second nozzles 121, 122.

In various embodiments, the system 200 also includes a pump 212. The pump 212 may be any type of mechanical or electrical pump and may include a filtering element (not shown) that may be in addition to, or in place of, the filtering element 210.

While the illustrated embodiments include two nozzles to deliver fluid to the sensor lens surface 108, it is understood that other embodiments include one, three, four, or more nozzles. Additionally, while the illustrated embodiment of the system 200 includes a vertical alignment of the catch basin 202, the connecting member 204, and the tank 206, it is understood that these components can be arranged in any configuration that allows for collection, storage, and reuse of a fluid applied to the sensor lens surface 108.

Figure 3:
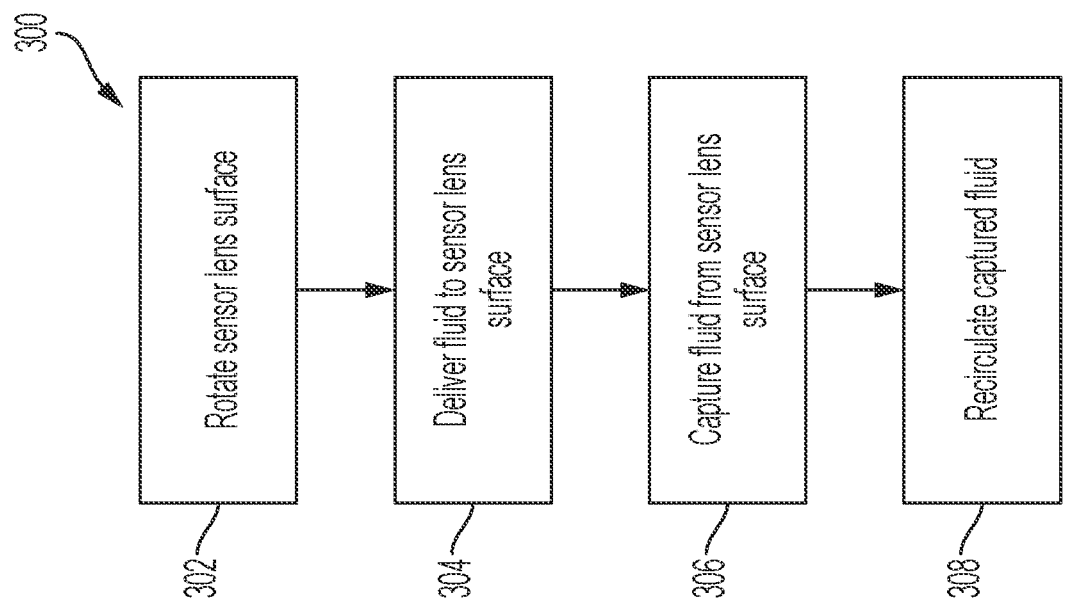
FIG. 3 is a flowchart illustration of a method for sensor lens cleaning, according to an embodiment.

FIG. 3 illustrates a method 300 to clean and protect a sensor lens, according to an embodiment. The method 300 can be utilized in connection with the sensor 100 and the system 200 discussed herein, or by other systems associated with or separate from the vehicle, in accordance with exemplary embodiments. The order of operation of the method 300 is not limited to the sequential execution as illustrated in FIG. 3, but may be performed in one or more varying orders, or steps may be performed simultaneously, as applicable in accordance with the present disclosure.

Beginning at 302, the sensor lens surface 108 of the sensor 100 is rotated relative to the sensor body 102. In various embodiments, the rotation of the sensor lens surface 108 is controlled by a controller, such as a vehicle controller.

Next, at 304, fluid, such as the fluid 208, is delivered to the sensor lens surface 108. As shown in FIGS. 1 and 2, the fluid 208 is delivered by one or more nozzles, such as the first and second nozzles 121, 122. The one or more pressurized nozzles deliver the fluid 208 from a fluid source, such as the tank 206. The fluid 208 is delivered to a position near the center of the concave sensor lens surface 108.

Due to centrifugal force caused by the rotation of the sensor lens surface 108, the fluid 208 travels from the center to the outer edge 110 of the sensor lens surface 108 to at least partially and in many embodiments, nearly fully, cover the sensor lens surface 108. As the fluid 208 reaches the outer edge 110 of the sensor lens surface 108, the fluid 208 falls off the sensor lens surface 108 and into a trough or catch basin 202, at step 306.

The captured fluid 208 is transferred back to the tank 206 via a connecting member 204 that may be a hose, pipe, or other means for fluidically connecting the catch basin 202 and the tank 206. The fluid 208 is then filtered and recirculated to the one or more nozzles, at step 308, for continued use in providing a barrier and cushion for the sensor lens surface 108.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can" "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A sensor lens assembly, comprising:
    a cylindrical sensor body including a lower surface, a sensor lens surface, and a side surface extending between the lower surface and an outer edge of the sensor lens surface;
    a sensor member enclosed within the cylindrical sensor body and adjacent to the sensor lens surface; and
    a nozzle configured to deliver a fluid to a middle of the sensor lens surface;
    wherein the sensor lens surface is concave and rotates relative to the side surface of the cylindrical sensor body such that centrifugal force causes the fluid to form a film on the sensor lens surface that acts as a barrier, cushion, and particle collecting medium on the sensor lens surface.

2. The sensor lens assembly of claim 1, wherein the nozzle comprises a first nozzle and a second nozzle.

3. The sensor lens assembly of claim 1 further comprising a catch basin that at least partially surrounds the cylindrical sensor body such that the catch basin captures fluid that falls over the outer edge of the sensor lens surface.

4. The sensor lens assembly of claim 3 further comprising a tank fluidically coupled with the catch basin such that the captured fluid is stored within the tank.

5. The sensor lens assembly of claim 4 further comprising a connecting member configured to allow the fluid to pass from the catch basin to the tank.

6. The sensor lens assembly of claim 4, wherein the nozzle is fluidically coupled with the tank such that the captured fluid is recirculated and reused to form the film on the sensor lens surface.

7. The sensor lens assembly of claim 4 further comprising a filtering element configured to filter the fluid captured from the sensor lens surface.

8. The sensor lens assembly of claim 7, wherein the filtering element is disposed within the tank.

9. A system for sensor lens cleaning, comprising:
    a cylindrical sensor body including a lower surface, a sensor lens surface, and a side surface extending between the lower surface and an outer edge of the sensor lens surface; and
    a nozzle configured to deliver a fluid to a middle of the sensor lens surface;
    wherein the sensor lens surface is concave and rotates relative to the side surface of the cylindrical sensor body such that centrifugal force causes the fluid to form a film on the sensor lens surface that acts as a barrier, cushion, and particle collecting medium on the sensor lens surface.

10. The system of claim 9, wherein the nozzle comprises a first nozzle and a second nozzle.

11. The system of claim 9 further comprising a catch basin that at least partially surrounds the cylindrical sensor body such that the catch basin captures fluid that falls over the outer edge of the sensor lens surface.

12. The system of claim 11 further comprising a tank fluidically coupled with the catch basin such that the captured fluid is stored within the tank.

13. The system of claim 12, wherein the nozzle is fluidically coupled with the tank such that the captured fluid is recirculated and reused to form the film on the sensor lens surface.

14. The system of claim 12 further comprising a filtering element configured to filter the fluid captured from the sensor lens surface.

15. A method for cleaning and protecting a sensor lens surface, comprising:
    providing a sensor having a cylindrical sensor body including a lower surface, a concave and rotatable sensor lens surface, and a side surface extending between the lower surface and an outer edge of the sensor lens surface and a nozzle configured to deliver a fluid to a middle of the sensor lens surface;
    rotating the sensor lens surface relative to the side surface of the sensor body;
    delivering the fluid to the middle of the sensor lens surface such that centrifugal force causes the fluid to form a film on the sensor lens surface that acts as a barrier, cushion, and particle collecting medium on the sensor lens surface;
    capturing the fluid that falls off the outer edge of the sensor lens surface; and
    recirculating and reusing the fluid captured from the sensor lens surface via the nozzle.

16. The method of claim 15, wherein the nozzle comprises a first nozzle and a second nozzle.

17. The method of claim 15 further comprising providing a catch basin that at least partially surrounds the sensor body such that the catch basin captures the fluid that falls over the outer edge of the sensor lens surface.

18. The method of claim 17 further comprising providing a tank fluidically coupled with the catch basin such that the captured fluid is stored within the tank.

19. The method of claim 18, wherein the nozzle is fluidically coupled with the tank such that the captured fluid is recirculated and reused to form the film on the sensor lens surface.

20. The method of claim 19 further comprising providing a filtering element configured to filter the fluid captured from the sensor lens surface.

* * * * *